US012780405B2

(12) United States Patent
Bourland et al.

(10) Patent No.: US 12,780,405 B2
(45) Date of Patent: Nov. 3, 2026

(54) MECHANICAL CONTROL ACTUATOR FOR AN AIRCRAFT

(71) Applicant: THALES, Meudon (FR)

(72) Inventors: Jean-Claude Bourland, Chatellerault (FR); Gérard Simon-Bouhet, Chatellerault (FR); Gilles Thouvenot, Valence (FR)

(73) Assignee: THALES, Meudon (FR)

( * ) Notice: Subject to any disclaimer, the term of this patent is extended or adjusted under 35 U.S.C. 154(b) by 0 days.

(21) Appl. No.: 19/135,351

(22) PCT Filed: Dec. 12, 2023

(86) PCT No.: PCT/EP2023/085441
§ 371 (c)(1),
(2) Date: Jun. 3, 2025

(87) PCT Pub. No.: WO2024/126525
PCT Pub. Date: Jun. 20, 2024

(65) Prior Publication Data

US 2026/0242055 A1 Aug. 20, 2026

(30) Foreign Application Priority Data

Dec. 14, 2022 (FR) ...................................... 2213352

(51) Int. Cl.
*B64C 13/50* (2006.01)
*B64C 13/10* (2006.01)
(Continued)

(52) U.S. Cl.
CPC ............ *B64C 13/505* (2018.01); *B64C 13/10* (2013.01); *B64C 13/18* (2013.01); *F16D 55/226* (2013.01); *F16D 59/00* (2013.01); *F16D 2065/383* (2013.01); *F16D 65/46* (2013.01); *F16F 15/035* (2013.01)

(58) Field of Classification Search
CPC ......... B64C 13/04; B64C 13/10; B64C 13/18; B64C 13/22; B64C 13/34; B64C 13/505
See application file for complete search history.

(56) References Cited

U.S. PATENT DOCUMENTS 5,184,054 A * 2/1993 Delattre .................. B64C 27/82
318/12
6,325,331 B1 * 12/2001 McKeown .............. B64C 13/16
244/221

(Continued)

*Primary Examiner* — Tye William Abell
(74) *Attorney, Agent, or Firm* — BakerHostetler

(57) ABSTRACT

A flight control actuator for providing assistance to means for piloting an aircraft is provided. This flight actuator includes an electric motor, an input shaft suitable for being rotated by the electric motor, the input shaft including an input clutch device, the input clutch device having an active position wherein it is capable of coupling the input shaft to an output shaft via an intermediate shaft, and an inactive position. The output shaft is capable of being connected to the apparatus or method for piloting the aircraft, the output shaft being suitable for being coupled to the input shaft when the input clutch device is in the active position. The actuator includes a backup assistance shaft, the backup assistance shaft being suitable for being coupled to the output shaft when the input clutch device is in the inactive position.

13 Claims, 6 Drawing Sheets

(51) Int. Cl.

| | |
|---|---|
| ***B64C 13/18*** | (2006.01) |
| *F16D 55/226* | (2006.01) |
| *F16D 59/00* | (2006.01) |
| *F16D 65/38* | (2006.01) |
| *F16D 65/46* | (2006.01) |
| *F16F 15/03* | (2006.01) |

(56) References Cited

U.S. PATENT DOCUMENTS

2005/0173595 A1* 8/2005 Hoh ........................ B64C 27/56
244/223
2015/0107957 A1* 4/2015 Kruk ..................... B64C 13/505
192/84.6
2017/0259915 A1* 9/2017 Cremiere ................ F16D 21/02
2018/0197385 A1* 7/2018 Jayaraman .............. H02P 6/085
2020/0369374 A1* 11/2020 Antraygue ............ F16D 27/102

* cited by examiner

MECHANICAL CONTROL ACTUATOR FOR AN AIRCRAFT

CROSS-REFERENCE TO RELATED APPLICATIONS

This application is a National Stage of International patent application PCT/EP2023/085441, filed on Dec. 12, 2023, which claims priority to foreign French patent application No. FR2213352, filed on Dec. 14, 2022, the disclosures of which are incorporated by reference in their entireties.

FIELD OF THE INVENTION

The present invention relates to a mechanical flight control actuator for providing assistance to means for piloting an aircraft. The technical field is therefore that of aeronautical mechanical flight controls and actuators providing force feedback on a control column or pedal, particularly for a helicopter.

BACKGROUND

In an automatic flight control system (AFCS), a helicopter is piloted by means of equipment that controls and moves the linkage (or flight path), which is engaged with the control surfaces or flight surfaces, possibly, depending on the dimension of the helicopter, via power amplification, for example via hydraulic valves. Piloting can be completely automatic using both guidance algorithms and stabilization algorithms for the flight qualities, semi-automatic piloting with joint manual action on the control column/pedals, or disengaged and in manual piloting mode.

In a helicopter, the avionics control the four piloting axes, roll/pitch/yaw and collective pitch. A conventional AFCS architecture comprises, for actuating the linkage travel, dedicated low-authority, high-speed series linear actuators for flight stabilization, and high-authority, low-speed parallel rotary actuators for trim, which additionally provide force feedback during manual piloting.

In a reduced architecture, higher speed and bandwidth trim actuators make it possible to envisage stability functions as a backup or during degraded flight control performance.

In the old generation of electromechanical trim, during manual piloting with the force law activated, the actuators required passive friction that was produced by mechanical devices in the linkage of the helicopter (a pad on the linkage, for example on the collective axis).

The friction of the helicopter comprises a portion inherent to the linkage (fairly limited depending on the helicopter, between 0.5 and 3 Nm or even 5 Nm on some axes and helicopter types), and trim adjustment consists of a pre-load of the order of the linkage friction for pilot comfort during manual piloting, and slightly more with a margin for guarding against unintentional disengagement of automatic pilot. Depending on the helicopter type and axes, there can also be a need for a local friction device, typically of the order of 6 Nm.

In this configuration, a backup passive friction device in the linkage becomes a limitation due to its variability (under load factor, wear), and becomes a drawback for controlling a force law that was pre-determined during nominal operation. In addition, for a motorized force law, maximum reversibility is sought for a free shaft feel and to accurately and faithfully (non-linearities) render a force law that is adaptable in flight, over the whole flight envelope.

Pads in the linkage are devices that are subject to wear, constantly stressed and therefore difficult to manage relative to the AFCS avionics suite. This leads to periodic inspections and re-calibrations.

Such actuators are disclosed in particular in documents U.S. Pat. Nos. 5,184,054 and 6,325,331.

For its part, document US20180197385 mentions the use of a trim actuator having a passive friction device inserted into a module on the output shaft or located in the linkage. This solution results in significant volume, however: typically a brake/clutch assuming forces of 20 Nm requires a volume of 80 mm diameter×45 mm length, i.e. 16% of the desired compact volume of the actuator and having a mass of 700 g, i.e. 35% of the desired overall mass of 2 kg of the actuator.

In addition, the mechanical friction power output from the actuator would be significant for the friction sizing and for the disengagement of this function, which must transmit the forces/kinematics of the actuator.

There is therefore a need for a mechanical control actuator for an actuator allowing an optimized backup function (friction, viscous damping) while being very compact.

SUMMARY OF THE INVENTION

The present invention aims to at least partially meet this need.

The present invention more particularly aims to propose a high-integrity mechanical control actuator capable of delivering force feedback to the pilot through integrated control of its motor assembly.

To this end, a first object of the invention relates to a flight actuator for providing assistance to means for piloting an aircraft. Said flight actuator comprises:

- an electric motor;
- an input shaft suitable for being rotated by the electric motor, said input shaft comprising an input clutch device, said input clutch device having an active position in which it is capable of coupling the input shaft to an output shaft, and an inactive position;
- the output shaft is capable of being connected to the means for piloting the aircraft, said output shaft being suitable for being coupled to the input shaft when the input clutch device is in the active position.

The actuator comprises:

- a backup assistance shaft, said assistance shaft being suitable for being coupled to the output shaft when the input clutch device is in the inactive position, said backup assistance shaft being capable of braking and/or damping rotational movements of the output shaft, said backup assistance shaft not being capable of rotating the output shaft.

The invention consists of a new adjustable backup friction and viscous damping function of the $M=C\dot{\theta}$ type (passive devices), with the specific feature of a device applied selectively by means of an input clutch and a backup assistance shaft suitable for acting on the output shaft when the input clutch device is in an inactive position. Such an actuator allows great compactness as this device is designed in an upstream part of the transmission of the equipment with limited maximum torque on the shaft at which the unit can be activated. In nominal operation, the active force feedback is provided by torque control of the motor and estimation of the resisting torque on the output shaft, which makes it possible to render dynamic tactile feedback with torque and damping. The intermediate shaft is capable of forming or holding a gear set for coupling the input shaft to the output shaft. In a complete mechanical configuration, the backup assistance shaft is capable of braking and damping rotational movements of the output shaft. In a reduced configuration on assembly, the backup assistance shaft is capable of braking or damping rotational movements of the output shaft. When the backup assistance shaft is not capable of rotating the output shaft, the backup assistance is passive and is not capable of rotating the output shaft. The drive is then lost. The rotation of the output shaft is then only caused by the pilot and the aerodynamic reactions (rotations external to the actuator). The notion of assistance is ensured by the main function, in nominal operation, for example when there is no fault detected by a monitoring unit. This makes it possible to keep the input clutch device 112 engaged.

In one particular embodiment, the backup assistance shaft comprises a backup assistance clutch device. This backup assistance clutch device has an active position in which it makes it possible to drive the output shaft, and an inactive position. The backup assistance clutch device is in its active position when the input clutch device is in its inactive position, and said backup assistance clutch device is in its inactive position when the input clutch device is in its active position.

The adjustable backup friction and damping function is applied selectively by means of a first clutch held by the input shaft and a second clutch held by the backup assistance shaft. The operation of these clutches is coordinated.

In one particular embodiment, a failure of the electric motor renders the input clutch device inactive and renders the backup assistance clutch device active. This is made possible by a monitoring unit suitable for detecting failures. A failure of the electric motor is thus detected by the monitoring unit, which controls the clutch device having two clutches, rendering the input clutch device inactive and rendering the backup assistance clutch device active.

If a fault is detected, in a few tens of milliseconds the mechanical actuator switches the load of the output shaft, in fail-safe configuration, between the motorized shaft and the shaft of the passive friction/damping device. The feel of the load switch (to the backup assistance shaft) is favorable due to the damping of the torque transient. In addition, the damping on the backup assistance shaft acts favorably on the motor input shaft, which would transiently have an established or residual speed after passivation by the monitoring unit, for example, on a 28 V cut-off by a circuit breaker on the power point.

In one particular embodiment, the input clutch device and the backup assistance clutch device are electrically controlled. This electrical control is common to the safety aspects and has the specific feature of automatic shaft switching devices with a complementary dual clutch device with three shafts. This allows a very high level of integrity with dual electronic and physical monitoring of the rotation of the backup assistance shaft. In addition, the clutch devices are electrically controlled by a force drive release (FDR).

In one particular embodiment, the backup assistance shaft comprises a braking device and/or a damping device. In a fail-safe architecture, devices are deselected during nominal operation in order to eliminate any unwanted force, and active assistance is performed by the motor control. The backup assistance is applied selectively. The control actuator allows a very high level of availability of the dual clutch device. The design of this actuator upstream of the transmission between the pinion of the motor and the downstream gear set improves the mass to volume ratio.

In one particular embodiment, the braking device comprises a friction disk brake, said brake being set by means of spring washers. These spring washers are Belleville washers. The braking device can thus be adjusted during maintenance.

In one particular embodiment, the braking device comprises a system for adjusting the setting of the brake disks.

In one particular embodiment, the adjustment system comprises a transfer device. This transfer device is positioned on the most accessible front face of the actuator in the aircraft installation, that is, on the output shaft side.

In one particular embodiment, the damping device comprises an eddy current damper.

In one particular embodiment, the flight actuator comprises an intermediate shaft positioned between the input shaft, the backup assistance shaft and the output shaft. This makes it possible to achieve an aim of compactness in terms of volume to mass ratio of a passive assistance device designed between the upstream reduction stage of the motor and the downstream gear set.

In one particular embodiment, the control actuator comprises dual electronic and physical monitoring of the rotation of the backup assistance shaft.

Another object of the invention relates to an automatic flight control system of an aircraft, comprising a mechanical flight control actuator comprising a backup assistance shaft, said backup assistance shaft being suitable for being coupled to the output shaft when the input clutch device is in the inactive position. The assistance shaft is capable of braking and/or damping rotational movements of the output shaft, said backup assistance shaft not being capable of rotating the output shaft.

BRIEF DESCRIPTION OF THE DRAWINGS

The present invention will be better understood on reading the detailed description of embodiments given by way of non-limiting examples and illustrated by the appended drawings, in which.

DETAILED DESCRIPTION

The invention is not limited to the embodiments and variants described, and further embodiments and variants will be clearly apparent to a person skilled in the art.

Figure 1:
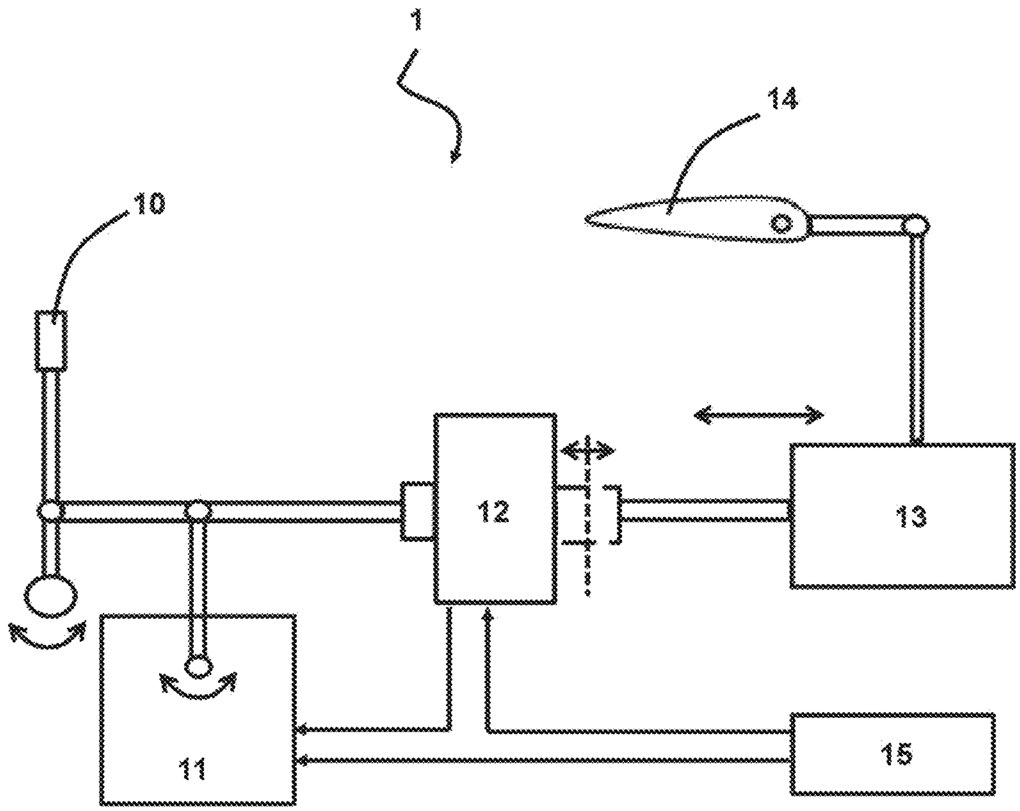
FIG. 1 illustrates an automatic flight control system of an aircraft comprising a mechanical flight control actuator according to the invention engaged on the linkage.

FIG. 1 illustrates an automatic flight control system 1 of an aircraft.

The automatic flight control system 1 comprises:

a control column 10;

a mechanical flight control actuator 11;

a linear actuator 12;

a hydraulic actuator 13;

a controllable flight surface 14;

a flight control computer (FCC) 15.

The control column 10 is used for handling by the pilot. This column 10 makes it possible to control the entire linkage of the aircraft.

The mechanical flight control actuator 11 is suitable for providing force feedback to the control column 10. Here, this mechanical flight control actuator 11 is a parallel rotary actuator. It thus makes it possible to render a force law that is adjustable in flight accurately in the flight envelope. This force law is a function of the angular displacement of the control column 10. It is a digitizable force law that can be adjusted in flight. In this pilot force feedback mode, this actuator thus makes it possible to assist the pilot in their control operations. In a second "autotrim" mode, the mechanical flight control actuator 11 is capable of receiving movement controls coming from the linear actuator 12 and the flight control computer 15.

The linear actuator 12 is coupled in series in the linkage, engaged with the hydraulic actuator or amplifier 13, which pushes the controllable flight surface 14. The linear actuator thus creates a linear movement over a travel of the order of one mm to several hundred mm. The linear actuator 12 receives position commands and sends the current position to the flight control computer 15, which can be in charge of the AP algorithms. In one variant, the AP algorithms are implemented in the processor of the linear actuator 12. The linear actuator is thus suitable for converting a command from the pilot into a specific order to the hydraulic actuator 13. More particularly, the linear actuator 12 is suitable for creating a straight-line movement. It receives data from the flight control computer 15.

The hydraulic actuator 13 is capable of receiving information from the linear actuator 12 with the aim of controlling the controllable flight surface 14. In the context of mechanical flight controls (as opposed to electric flight controls), the hydraulic actuator 13 amplifies the force/displacement over the travel of the linear actuator 12 with the aim of controlling or moving the controllable flight surface 14. The hydraulic actuator 13 is for example a hydraulic cylinder.

The controllable flight surface 14 is moved to control the flight of the aircraft. The controlling of this controllable flight surface 14 contributes to the stabilization of the aircraft (four control axes on a helicopter). The controllable flight surface 14 is thus suitable for influencing the movement of the aircraft. It allows interaction between the outside air and the aircraft. Here, this controllable flight surface 14 is controlled about an axis of rotation X.

The flight control computer 15 is suitable for controlling the flight of the aircraft (automatic pilot function). To this end, it acts on the control of the parallel rotary actuator (mechanical flight control actuator 11) and on the linear actuator 12.

Figure 2:
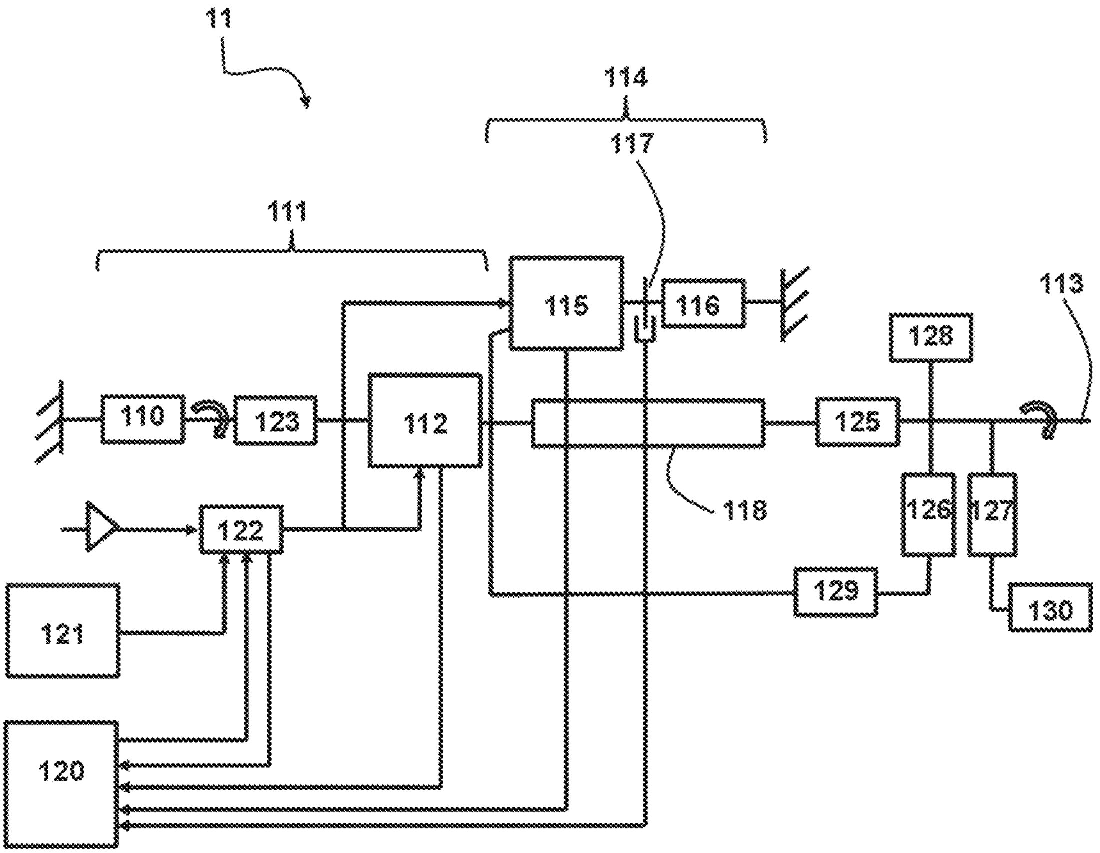
FIG. 2 schematically illustrates the mechanical flight control actuator in FIG. 1.

FIG. 2 schematically illustrates the mechanical flight control actuator 11 in FIG. 1. This mechanical flight control actuator 11 comprises:

- an electric motor 110;
- an input shaft 111;
- an input clutch device 112;
- an output shaft 113;
- a backup assistance shaft 114;
- a backup assistance clutch device 115;
- a braking device 116;
- a damping device 117;
- an intermediate shaft 118;
- a monitoring device 120;
- a control device 121;
- a logic operation device 122;
- a gear 123;
- a protective device 125;
- a first sensor 126;
- a second sensor 127;
- a third sensor 128;
- a fourth sensor 129;
- a fifth sensor 130.

The electric motor 110 is suitable for rotating the input shaft 111. Here, this motor 110 is a brushless direct current motor that is very reliable and allows an optimized comprise in terms of electromagnetic density, and inertia and cogging torque characteristics.

The input shaft 111 is suitable for being rotated by the motor 110 by means of the gear 123. This input shaft 111 comprises the input clutch device 112, which can also be referred to as the clutch EM1. This clutch device 112 can adopt an active position in which it couples the input shaft 111 to the output shaft 113 via the intermediate shaft 118, which holds a gear set. The input clutch device 112 can adopt an inactive position in which it does not couple the input shaft 111 to the output shaft 113. The input clutch device 112 is a friction/sliding device.

The output shaft 113 is suitable for being coupled to the input shaft 111 when the input clutch device 112 is active via the intermediate shaft, which holds a gear set. When this input clutch device 112 is inactive, the output shaft 113 is braked and/or damped by the braking device 116 and/or the damping device 117 belonging to the backup assistance shaft 114.

The backup assistance shaft 114 is suitable for braking and/or damping rotational movements of the output shaft 113, according to the mechanical configuration assembled. This backup assistance shaft 114 comprises the backup assistance clutch device 115, the braking device 116, and/or the damping device 117.

The backup assistance clutch device 115 is suitable for coupling the backup assistance shaft 114 to the output shaft 113. This backup assistance clutch device 115 has an active position in which it makes it possible to couple the backup assistance shaft 114 to the output shaft 113. The backup assistance clutch device 115 also has an inactive position in which the backup assistance shaft 114 and the output shaft 113 are not coupled. The backup assistance clutch device 115 is in its active position when the input clutch device 112 is in its inactive position, and said backup assistance clutch device 115 is in its inactive position when the input clutch device 112 is in its active position. The input clutch device 112 and the backup assistance clutch device 115 are therefore complementary logic devices.

The assistance clutch device 112 is a friction/sliding device. As a variant, this assistance clutch device 112 uses jaw technology.

A failure of the electric motor renders the input clutch device 112 inactive and renders the backup assistance clutch device active 115. It will also be noted that the input clutch device 112 and the backup assistance clutch device 114 are electrically controlled through the use of coils. The input clutch device 112 is activated by current, which requires the application of a voltage of 28 V for example in the coil of said device in order to render it active. The backup assistance clutch device 115 is activated by a lack of current. This device is therefore active in the absence of power in the coil of the device.

The braking device 116 is suitable for braking the rotation of the output shaft 113, when the backup assistance clutch device 115 is active. This braking device 116 is a passive braking device. Advantageously, the braking device 116 is an adjustable friction device.

The damping device 117 is suitable for damping the jolts during dynamic transients caused by the linkage (aerodynamic effect on the controllable flight surfaces). The damping device 117 is a passive damping device. Advantageously, the damping device 117 is a viscous device, for example a device in which the resisting torque is proportional to the angular speed of the supported shaft.

Figure 4:
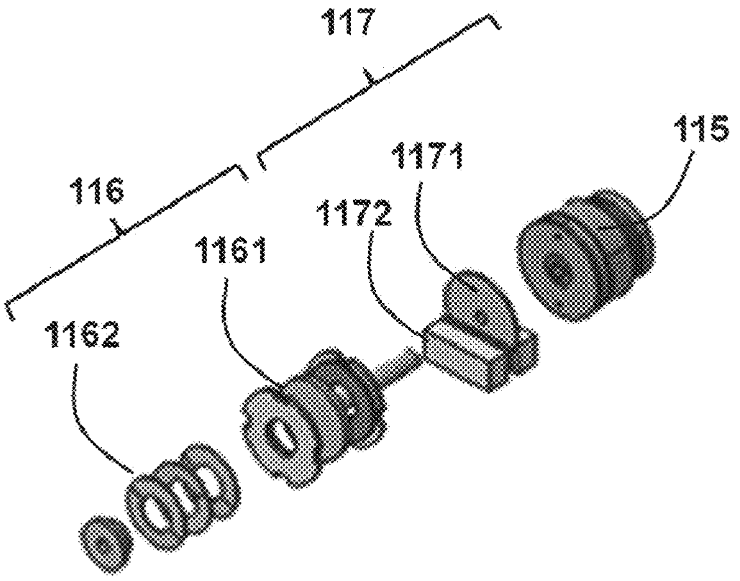
FIG. 4 schematically illustrates a braking device and a damping device of the mechanical flight control actuator in FIG. 3.

The braking device 116 and the damping device 117 are illustrated in particular in FIG. 4. Here, the braking device 116 comprises a friction disk brake 1161 set by means of spring washers 1162. These spring washer 1162 provide an adjustable bearing force of between 0 and 6 Nm.

The damping device 117 is an eddy current device and comprises a metal disk 1171 rotating in or in front of a magnetic circuit 1172. The magnetization of the magnetic circuit 1172 can be adjusted by duplication of magnets, by increasing the intercepted surface area of the rotating disk 1171, by treating the disk 1171, which allows an increase factor of the order of 30. As a variant, it is possible to replace the magnets with a powered coil with a capacity to increase damping by a factor of 60. The damping device 117 allows damping in the range of 1.5 to 4.5 Nm/rad/s on the output shaft 113.

The mechanical flight control actuator (parallel rotary actuator) 11 also comprises the intermediate shaft 118. This intermediate shaft 118 is positioned between the input shaft 111, the backup assistance shaft 114, and the output shaft 113. This intermediate shaft 118 is suitable for mechanically connecting the input shaft 111 to the output shaft 113 or for mechanically connecting the backup assistance shaft 114 to the output shaft 113. This intermediate shaft is suitable for holding a gear set that makes it possible to produce a reduction ratio.

The mechanical flight control actuator 11 comprises the monitoring device 120. The monitoring device 120 monitors the transmission control system and controls the two complementary clutch devices, forcing the disengagement of the input clutch device and the engagement of the backup clutch device if a fault is detected on the motor and transmission system. If a fault is detected by the monitoring device 120, in a few tens of milliseconds, the compact system switches the load of the output shaft, in fail-safe configuration, between the motorized shaft and the shaft of the passive friction/damping device. This monitoring device 120 is suitable for transmitting a control signal to the complementary clutch devices. This monitoring device 120 includes electronic hardware, and software.

The control device 121 is suitable for controlling voltages/current in the coils belonging to the input clutch device 112 and the backup assistance clutch device 115. More particularly, this control device 121 supervises the modes of the actuator and carries out high-level control of the actuator and the high-frequency control of the motor (control loops).

The logic operation device 122 makes it possible to perform an OR type logic operation. This device 122 is thus suitable for receiving a force drive release (FDR) signal, and signals coming from the monitoring device 120 and potentially from the control device 121. This device 122 is suitable for delivering signals to the input clutch device 112 and the backup assistance clutch device 115.

The protective device 125 comprises a torque limiter or fuse on the output shaft 113. This device 125 makes it possible to protect the mechanical system up to the output of the output shaft 113 in the event of a failure, albeit very improbable, linked to the electromechanical components and bearing of the transmission resulting in the seizing of said output shaft 113.

A monitoring device comprises a first sensor 126, a second sensor 127, a third sensor 128, a fourth sensor 129, and a fifth sensor 130. These sensors make it possible, in particular, to monitor the rotation of the output shaft 113. These sensors are for example Hall effect sensors positioned facing a magnet mounted on a nearby disk. This is based on the principle of the assembly of a reducer or any other bellows-type coupling means in line with the output shaft 113, for coupling a position/speed sensor. It will be noted that the third sensor 128 is typically a separate speed sensor.

It will also be noted that the system is designed for maximum safety, allowing a Catastrophic level of integrity (in accordance with regulations CS-29, CS-25, with a probability of 10−9/FH) or better for cases of fault detection relating to a force law that is lower than expected or excessive, with no possible passivation. The common circuit for control by the monitoring unit (a separate, segregated unit) controls the coils of the two clutches. This process is also monitored by the acquisition of a current/voltage signal from each of the coils. In addition to this monitoring, the invention particularly makes it possible to detect a potential engagement fault of the passive unit, which would result in an overload on the motorized system linked to this incorrectly engaged friction. Detection takes place through robust speed measurement by the monitoring unit via a Hall effect sensor positioned facing a magnet on a disk. In addition to current/voltage monitoring of the control stage of the two clutches, the invention includes specific rotation monitoring to ensure that the friction/damping unit is not abnormally engaged with rotation of its shaft in relation to the rotation of the upstream shaft on the motor side. The monitoring device 120 monitors the switching logic of the dual clutch and detects the state consistency of the two clutches using two different measurement circuits.

Finally, it will be noted that here, the electronics are suitable for performing self-testing of the motor assembly channel, using the backup friction channel to load the motor assembly of the main channel. In predictive maintenance, this makes it possible to calibrate the upstream transmission system/motor assembly on the predefined load and identify an equivalent model for a loaded motor and to allow for any aging.

Figure 3:
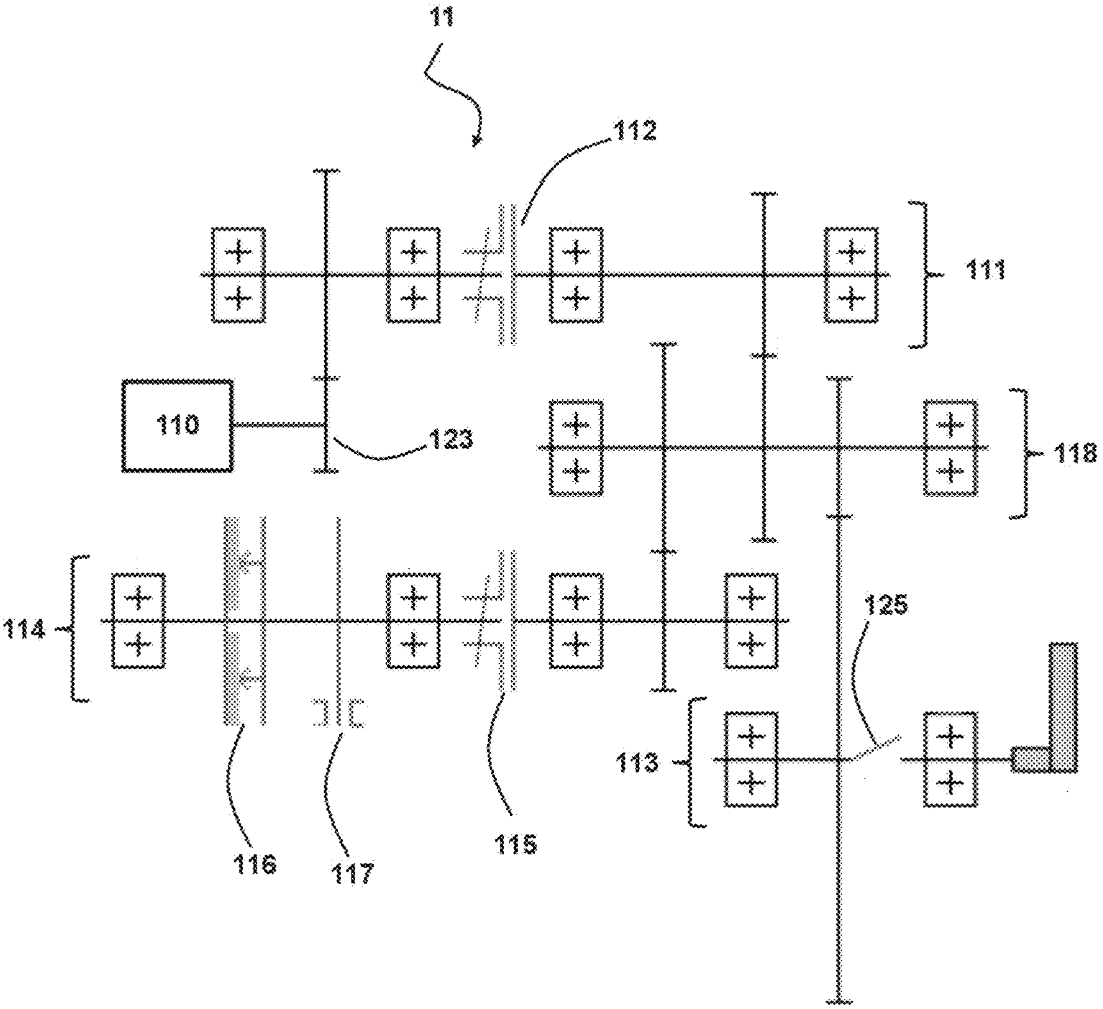
FIG. 3 illustrates in greater detail part of the mechanical flight control actuator in FIG. 2.

FIG. 3 illustrates in greater detail part of the mechanical flight control actuator 11 (parallel rotary actuator) comprising an electromechanical part with a motor, clutches, shafts, bearings, gear sets, a friction device, and a damping device.

The control state logic of the input clutch device 112 and the backup assistance clutch device 115 is as follows:

- In an initialization state, the input clutch device 112 is inactive and the backup assistance clutch device 115 is active. No current is injected into the coils of the clutch devices.
- In a nominal state, the input clutch device 112 is active and the backup assistance clutch device 115 is inactive. A nominal current is injected into each coil.
- In a fault state following the detection of a fault by the monitoring device 120, the monitoring device 120 controls the input clutch device 112 so that it is inactive and the backup assistance clutch device 115 so that it is active. No current/voltage is applied to the coils of the clutch devices 112, 115.

For ergonomics and the transition to a backup function in flight, the switch between the input clutch device 112 and the backup assistance clutch device 115 takes place in a short time and with compatible responsiveness of the two devices.

Preferably, the disengagement time of the input clutch device 112 is faster (of the order of 5 ms) than the engagement time of the backup assistance clutch device 115 (of the order of 10 ms). The damping on the shaft of the passive unit can act favorably in the case of engagement of the backup assistance clutch device 115 with a shaft/transmission coming from the motor assembly that transiently has an established speed or a residual speed after passivation by the monitoring device 120.

In addition, the damping on the backup assistance shaft 114 is improved in the case of engagement of the backup assistance clutch device 115 with the input shaft 111 that transiently has an established speed or a residual speed after passivation by the monitoring device 120.

It will also be noted that the braking device 116 of the backup assistance shaft 114 advantageously comprises a system for adjusting the setting of the brake disks 1161 in order not to overload the backup assistance clutch device 115.

Figure 5:
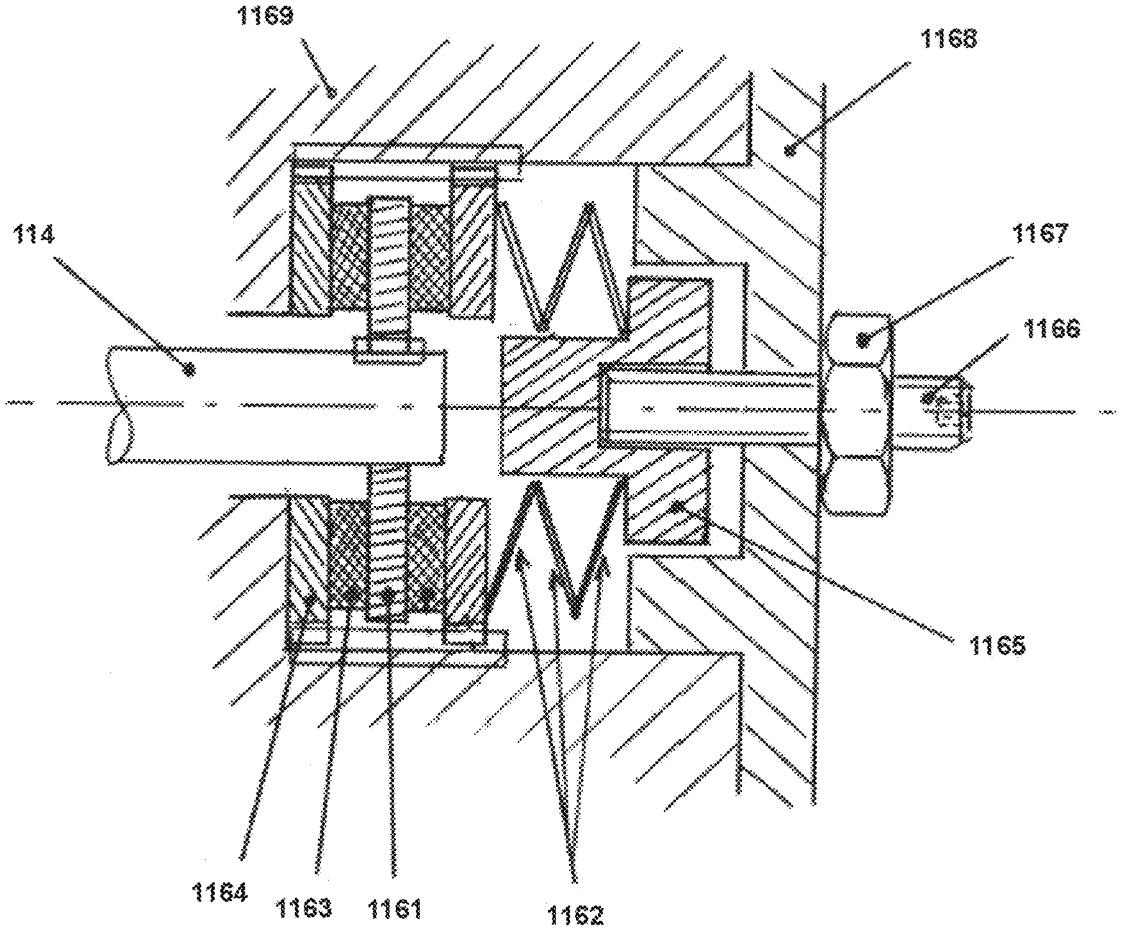
FIG. 5 schematically illustrates adjustment means on the backup assistance shaft in FIG. 4, according to a first variant.

FIG. 5 illustrates a first variant wherein the adjustment system is a screw adjustment system. FIG. 5 also shows a more detailed view of the braking device 116.

As stated previously, the braking device 116 comprises a disk 1161 and spring washers 1162. This braking device 116 further comprises:

friction linings 1163;

a pusher 1165;

a screw 1166;

a lock nut 1167.

The friction linings 1163 are suitable for gripping the disk 1161 in order to brake the rotation thereof. This disk 1161 is rotatably connected to the rest of the backup assistance shaft 114, but is however free to translate, for example via a keyway. In one variant embodiment wherein the backup assistance shaft 114 has sufficient axial clearance, the disk 1161 is rigidly connected to said backup assistance shaft 114. The friction linings 1163 are bonded onto flanges 1164.

The pusher 1165 is suitable for transmitting a setting force from the screw 1166 to the spring washers 1162. The screw 1166 thus sets the spring washers 1162 and as a result adjusts the slip torque of the friction assembly.

The lock nut 1167 makes it possible to immobilize the screw 1166 against a cover 1168 for closing the mechanism. This cover 1168 is in turn positioned on the mounting 1169. The mounting 1169 forms a sealed enclosure. It also comprises an EMC seal.

Figure 6:
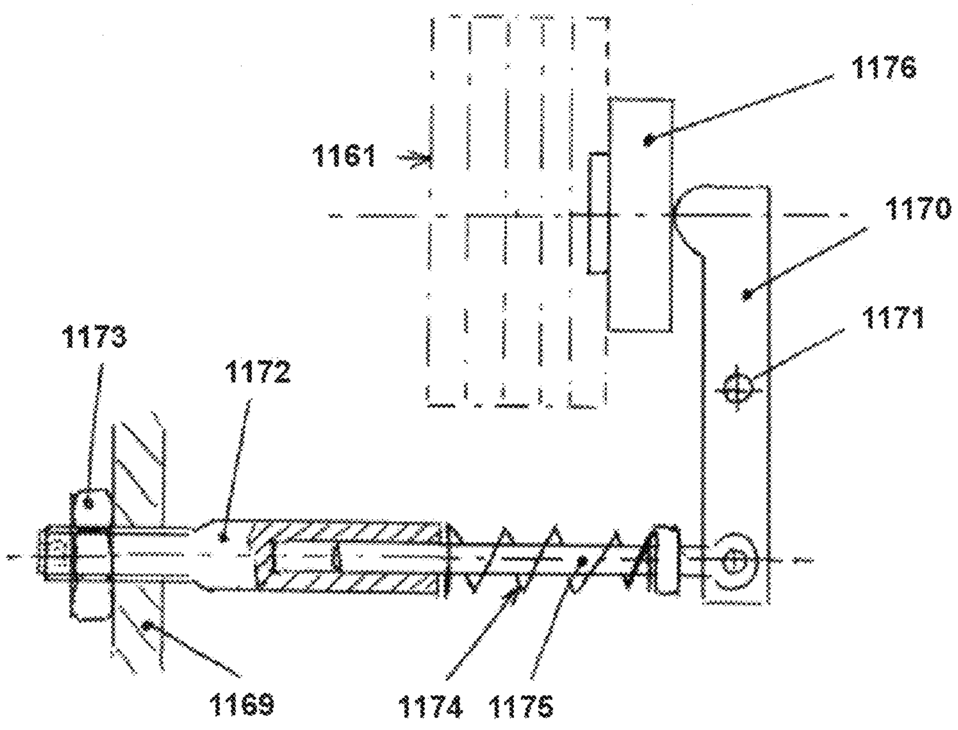
FIG. 6 schematically illustrates adjustment means on the backup assistance shaft in FIG. 4, according to a second variant.

FIG. 6 illustrates a second variant wherein the adjustment system comprises a transfer device.

The transfer device comprises:

a transfer lever 1170, a pivot 1171.

The adjustment system further comprises:

a screw 1172;

a lock nut 1173;

a spring 1174;

a push-rod 1175;

the disk 1161;

a pusher 1176.

The push-rod 1175 acts as a guide for the spring 1174 and transmits a force to the transfer lever 1170. The spring 1174 generates thrust between a lining (not shown) and the disk 1161. The thrust is transmitted by the rod 1175, the transfer lever 1170, and the pusher 1176.

The transfer lever 1170 is movable about the pivot 1171. This pivot is connected to the mounting 1169.

The screw 1172 sets the spring 1174 and as a result adjusts the slip torque of the friction assembly. The lock nut 1173 makes it possible to immobilize the screw 1172 against the mounting 1169.

The invention thus provides the following advantages:

backup friction that is activated automatically and only in the event of loss of motor control, thereby optimizing the reversibility and tactile feedback by motor control, and is safe by design in the event of loss of power;

more robust selective application with dependable characteristics in the long term;

an opportunity to add damping in the switched device;

so-called fail-safe switching even in the event of loss of power to the device, in a short time;

reduced mass, with a more compact device;

an alternative to the known dual clutch system available off the shelf, in the form of an integrated, miniaturized two-state switching device with fewer parts;

an opportunity to eliminate the friction devices mounted in the linkage;

during nominal operation, the production of programmable friction and damping by controlling motor torque, this device being easy to configure and contactless;

internal selective switching to backup friction/damping only in the event of loss of motor control;

negligible impact on the main function of the actuator (absence of local friction devices in the linkage due to the backup function, which is disengaged during nominal operation);

a high level of integrity and availability;

guaranteed stable performance over time;

high availability of the passive unit due to selective application;

a safe friction/damping device designed for a very high integrity "Smart Trim" actuator.

The invention advantageously makes it possible, in one development, to envisage coupling a second transmission system/motor assembly to increase the availability of the actuator in an integrated solution in a single actuator housing.

The invention claimed is:

1. A mechanical flight control actuator for providing assistance to means for piloting an aircraft, said flight actuator comprising:

an electric motor;

an input shaft suitable for being rotated by the electric motor, said input shaft comprising an input clutch device, said input clutch device having an active position wherein it is capable of coupling the input shaft to an output shaft via an intermediate shaft, and an inactive position;

the output shaft being capable of being connected to the means for piloting the aircraft, said output shaft being suitable for being coupled to the input shaft when the input clutch device is in the active position;

the actuator further comprising:

a backup assistance shaft, said backup assistance shaft being suitable for being coupled to the output shaft when the input clutch device is in the inactive position, said assistance shaft being capable of braking and/or damping rotational movements of the output shaft, said backup assistance shaft not being capable of rotating the output shaft.

2. The control actuator as claimed in claim 1, wherein said flight actuator comprises an intermediate shaft positioned between the input shaft, the backup assistance shaft, and the output shaft.

3. The control actuator as claimed in claim 1, said actuator comprising dual electronic and physical monitoring of the rotation of the backup assistance shaft.

4. The control actuator as claimed in claim 1, wherein the backup assistance shaft comprises a backup assistance clutch device, said backup assistance clutch device having an active position wherein it makes it possible to couple the backup assistance shaft to the output shaft and an inactive position and where said backup assistance clutch device is in the active position when the input clutch device is in its inactive position and said backup assistance clutch device is in its inactive position when the input clutch device is in its active position.

5. The control actuator as claimed in claim 4, wherein a failure of the electric motor renders the input clutch device inactive and renders the backup assistance clutch device active.

6. The control actuator as claimed in claim 4, wherein the input clutch device and the backup assistance clutch device are electrically controlled.

7. The control actuator as claimed in claim 1, wherein the backup assistance shaft comprises a braking device and/or a damping device.

8. The control actuator as claimed in claim 7, wherein the damping device comprises an eddy current damper.

9. The control actuator as claimed in claim 7, wherein the braking device comprises a friction disk brake, said brake being set by means of spring washers.

10. The control actuator as claimed in claim 9, wherein the braking device comprises a system for adjusting the setting of the brake disks.

11. The control actuator as claimed in claim 10, wherein the adjustment system is a screw adjustment system.

12. The control actuator as claimed in claim 10, wherein the adjustment system comprises a transfer device.

13. An automatic flight control system of an aircraft, the system comprising a mechanical flight control actuator as claimed in claim 1.

* * * * *